(12) United States Patent
Yang et al.

(10) Patent No.: US 7,370,753 B2
(45) Date of Patent: May 13, 2008

(54) EXTENDABLE CONVEYOR WITH BOOM BRAKE

(75) Inventors: Shenghong Yang, Plano, TX (US); James A Medley, Sparta, MI (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 130 days.

(21) Appl. No.: 11/482,490

(22) Filed: Jul. 7, 2006

(65) Prior Publication Data

US 2007/0012548 A1 Jan. 18, 2007

Related U.S. Application Data

(60) Provisional application No. 60/698,409, filed on Jul. 12, 2005.

(51) Int. Cl.
*B65G 15/60* (2006.01)
(52) U.S. Cl. .................. 198/812; 198/588; 193/35 TE
(58) Field of Classification Search ............... 198/812, 198/588, 592; 193/35 TE; 414/397, 398
See application file for complete search history.

(56) References Cited

U.S. PATENT DOCUMENTS

| 3,780,843 A * | 12/1973 | McGovern et al. ..... 198/35 TE |
| 3,835,980 A | 9/1974 | Brooks |
| 5,351,809 A | 10/1994 | Gilmore et al. |
| 5,423,413 A | 6/1995 | Gilmore |
| 6,003,658 A * | 12/1999 | Best et al. .................. 198/588 |
| 6,006,893 A | 12/1999 | Gilmore et al. |
| 6,431,346 B1 | 8/2002 | Gilmore et al. |
| 6,481,563 B1 | 11/2002 | Gilmore |
| 6,484,862 B1 | 11/2002 | Gilmore et al. |
| 6,533,096 B2 | 3/2003 | Gilmore et al. |
| 6,823,985 B2 * | 11/2004 | Gilmore et al. ............. 198/588 |
| 7,168,555 B2 * | 1/2007 | Peterson ..................... 198/812 |
| 2001/0009217 A1 * | 7/2001 | Gilmore et al. ............. 198/812 |
| 2004/0112719 A1 | 6/2004 | Gilmore et al. |
| 2004/0182682 A1 | 9/2004 | Chadwick |
| 2005/0217981 A1 | 10/2005 | Peterson |
| 2006/0011455 A1 | 1/2006 | Petersen |

FOREIGN PATENT DOCUMENTS

| EP | 1559666 | 8/2005 |
| EP | 1559667 | 8/2005 |
| EP | 1559668 | 8/2005 |
| EP | 1568627 | 8/2005 |
| EP | 1568628 | 8/2005 |
| WO | WO 02/08098 A2 | 1/2002 |

* cited by examiner

*Primary Examiner*—James R. Bidwell (57) ABSTRACT

An extendable conveyor includes a support structure, and at least one extendable unit that is supported in a cantilevered manner and that is movable between an extended position and a retracted position nested within the support structure. The extendable unit has at least one support roller for rollingly engaging at least one of another extendable unit and the support structure as the extendable unit is extended or retracted. The conveyor includes a braking device operable to limit rotation of at least one support roller via selective engagement of a braking element with the support roller. The braking device is activatable to disengage the braking element from the support roller in response to actuation of a user input. The braking element is biased to engage the braking element with the support roller when the braking device is deactivated.

22 Claims, 6 Drawing Sheets

EXTENDABLE CONVEYOR WITH BOOM BRAKE

CROSS REFERENCE TO RELATED APPLICATION

The present application claims benefit of U.S. provisional application, Ser. No. 60/698,409, filed Jul. 12, 2005, which is hereby incorporated herein by reference in its entirety.

FIELD OF THE INVENTION

The present invention relates generally to gravity loaders for loading packages and the like, such as into a truck/trailer, and more particularly, to a cantilevered telescopingly extendable gravity loader.

BACKGROUND OF THE INVENTION

Extendable loaders are often implemented at loading docks for trucks, trailers or the like. The gravity loaders are extendable into a truck/trailer and angled downward such that gravitational forces cause packages to move down the loaders along a plurality of rollers.

The loaders may be extended to reach further into the trailer, in order to minimize the manual lifting and carrying of the packages, and retracted to a stored position to minimize the space taken up by the loader when not in use. However, because of the substantial size and weight of these loaders, extension and retraction is often accomplished by powered extension and retraction systems, which are typically complicated and expensive devices. The powered extension and retraction systems are often used to stop and hold the loader at the desired degree of extension.

SUMMARY OF THE INVENTION

The present invention provides a cantilevered telescopic extendable loader or conveyor for loading articles or packages into a truck trailer or the like. The loader includes at least one extendable section or unit and is nested, such that the unit or units may be retracted into a base structure. The loader includes a braking device that functions to stop or substantially preclude movement of the extendable unit or units when the loader is not being selectively extended or retracted by an operator.

According to an aspect of the present invention, an extendable conveyor or loader includes a support structure and at least one extendable conveyor unit which is mechanically extendable between an extended position and a retracted position nested within the support structure. The loader includes a braking device at the extendable conveyor unit. The braking device is actuated or powered or energized to disengage a braking element to allow the extendable conveyor unit to extend and retract, and is deactivated or unpowered or de-energized to engage the braking element to limit movement of the extendable conveyor unit relative to the base structure.

The loader may include a plurality of extendable units nested within the support structure. For example, an inward or first extendable unit may be nested within the base structure, and an outward or second extendable unit may be nested within the first extendable unit, whereby the second extendable unit extends and retracts relative to the first extendable unit, while the first extendable unit extends and retracts relative to the base structure. The braking device may be located at one or both of the extendable units to limit relative movement between the first and second extendable units and/or between the first extendable unit and the base structure.

The braking element may engage a support roller or the like of one of the extendable units or the base, whereby the braking element may limit rotation of the support roller when so engaged, thereby limiting relative movement of the extendable unit or units. The braking device may include a biasing element that biases or urges the braking element into engagement with the support roller when the braking device is deactivated or de-energized.

The braking device may be powered in response to a user input, such as actuation of a joystick or the like, whereby the braking element is disengaged to allow the loader to extend or retract. The braking device may be unpowered or deactivated or de-energized in response to a release or non-use of the user input and/or in response to actuation of a bumper or stop at an end of an outermost extendable conveyor unit (or in response to other triggering events, such as activation of an emergency stop button or the like), whereby the braking element is engaged to limit or substantially preclude extension or retraction of the loader. The braking device thus may be automatically deactivated to engage the braking element whenever the extendable conveyor is not being selectively extended or retracted by an operator.

A plurality of conveying rollers are supported at the extendable conveyor unit and define a conveying surface. In a preferred embodiment, the extendable conveyor units and the conveying surface are orientated at an angle with respect to horizontal which is between at least approximately 3 degrees and at most approximately 5 degrees. The extendable conveyor units may have an upper portion along opposite sides thereof to provide sidewalls along and above the conveying surface.

Therefore, the present invention provides a cantilevered extendable conveyor or loader which provides optimal extension rates and package travel rates, while providing clearance of obstacles within the truck trailer. The extendable units are fully nested and may be readily extended and retracted via an electromechanical extension/retraction device. Extension of the extendable units is automatically limited or substantially precluded when such extension is not desired or elected by an operator. The braking device of the present invention thus provides a substantially fail-safe braking device for limiting movement of the extendable conveyor unit in situations where extension or retraction of the extendable conveyor unit is not desired.

These and other objects, advantages, purposes and features of the present invention will become apparent upon review of the following specification in conjunction with the drawings.

DESCRIPTION OF THE PREFERRED EMBODIMENTS

Figure 1:
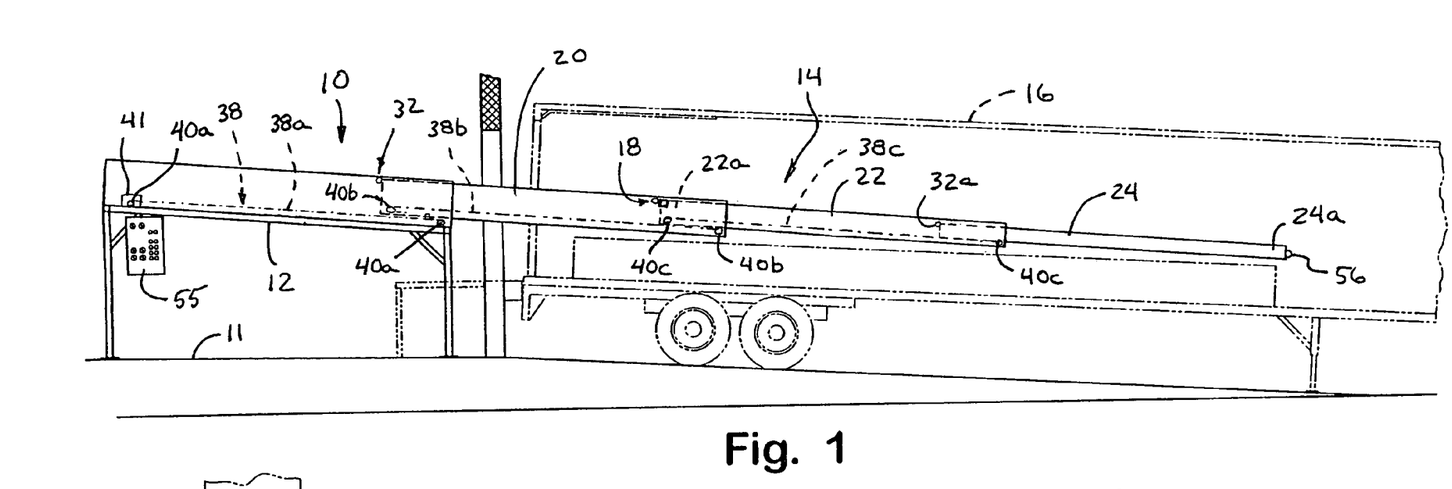
FIG. 1 is a side elevation of a cantilevered telescopic extendable gravity loader in its fully extended position into a truck trailer.
Figure 2:
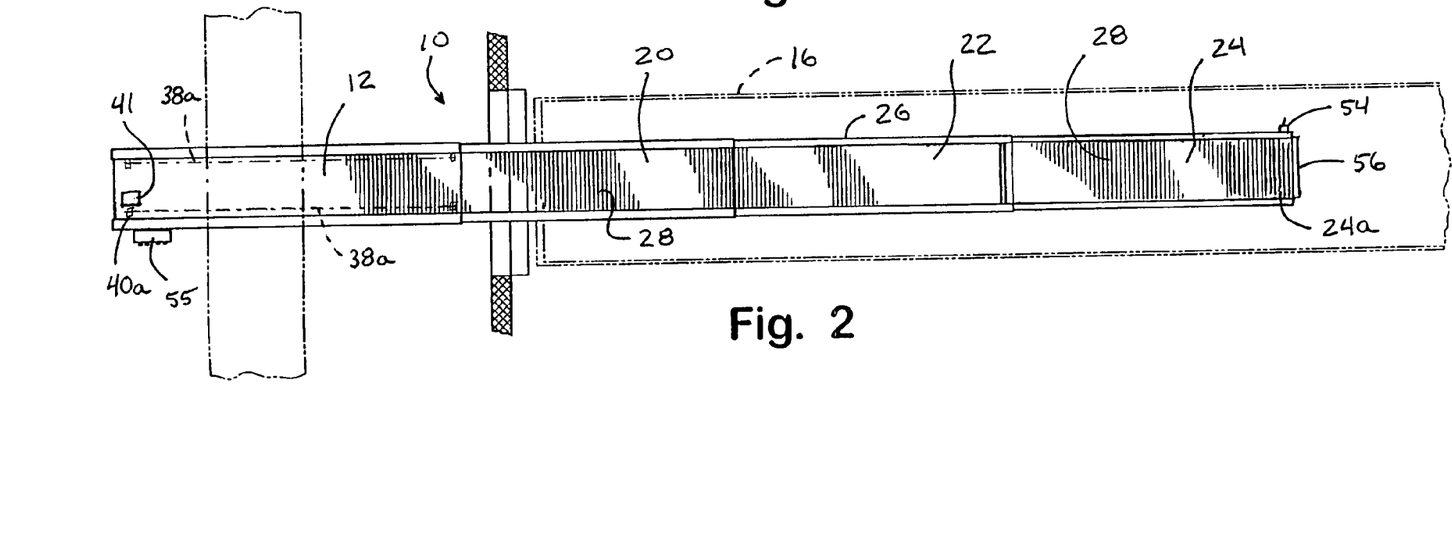
FIG. 2 is a top plan view of the extended loader of FIG. 1.
Figure 3:
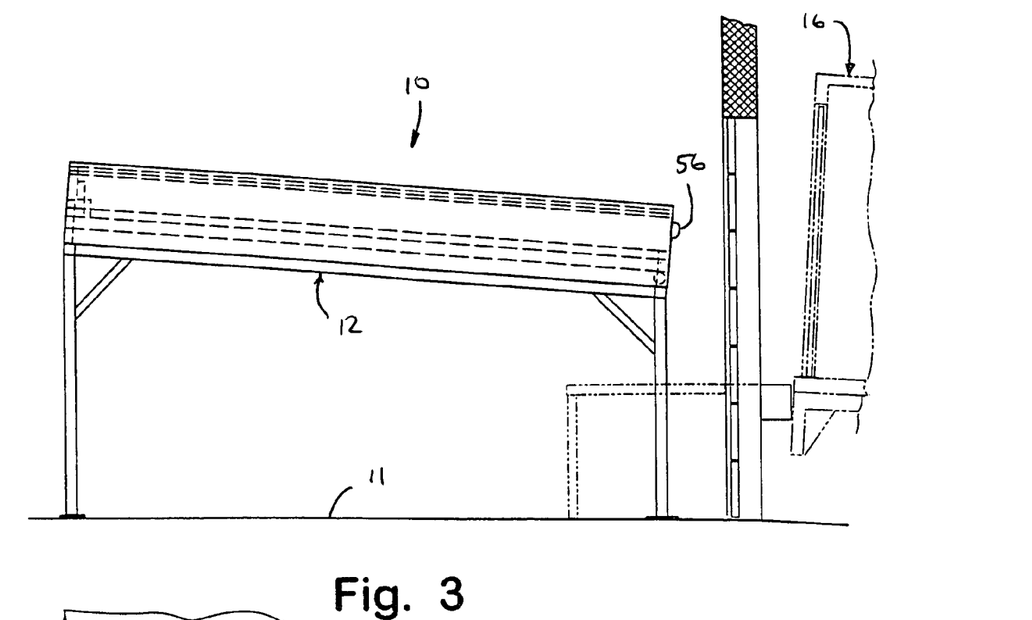
FIG. 3 is a side elevation similar to FIG. 1, with the loader in its fully retracted, stored position.
Figure 4:
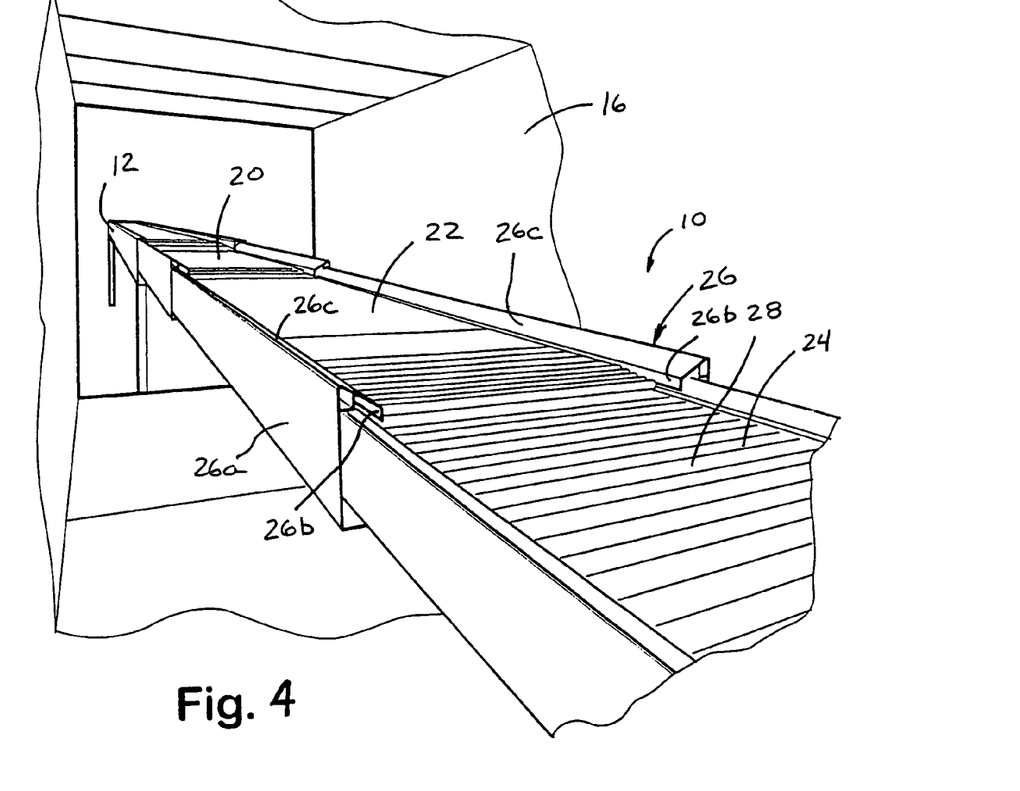
FIG. 4 is a perspective view of the gravity loader of FIG. 1, as viewed from inside the trailer being loaded.

Referring now specifically to the drawings and the illustrative embodiments depicted therein, a cantilevered telescopic extendable conveyor or loader 10 includes a support structure or base structure 12 and one or more extendable conveyor units 14, which are extendable and retractable relative to one another and base structure 12 (FIGS. 1-5). Base or support structure 12 may be mounted at a floor or support surface 11 of a warehouse, loading dock or the like, where a truck trailer 16 may be positioned for loading packages and the like therein. The extendable units 14 are extendable outwardly from base structure 12 and into truck trailer 16 (as shown in FIGS. 1, 2 and 4) for loading the packages at the loading dock into the truck trailer 16. The extendable units 14 are cantileverly supported by the next inwardly or rearwardly positioned unit and the base structure and are nested within one another, such that the units may be fully retracted into base structure 12 to a stored position (as shown in FIG. 3) which minimizes interference with the floor space of the loading dock when loader 10 is not in use. A braking device 18 is mounted or positioned at one or more of the extendable units, such as at an inward or rearward end of one of the extendable units (such as at an inward end 22a of extendable unit 22), and is operable to limit movement of the extendable unit relative to the adjacent inward or rearward extendable unit, as discussed below. As also discussed below, the extendable units and base structure may be interconnected via chains or cables 38 or the like, such that when relative movement between adjacent extendable units is limited, movement of the other extendable units relative to one another and relative to the base structure is also limited.

As used herein, unless otherwise noted, the terms outwardly and forwardly are used to describe the direction which the extendable units or sections 14 extend from the base structure 12, while the terms inwardly and rearwardly are used to describe the direction of travel of the extendable units 14 as they are retracted toward the base structure 12. These terms are intended to be illustrative and not limiting.

The gravity loader and extendable units may be substantially similar to the extendable units described in U.S. Pat. Nos. 6,823,985; 6,533,096; 6,484,862; 6,481,563; 6,431, 346; 5,423,413 and 5,351,809, which are hereby incorporated herein by reference. Because the extendable units may be substantially similar to those described in the above referenced patents, a detailed discussion of the extendable units will not be repeated herein. Briefly, each extendable unit 20, 22, 24 includes opposite sidewalls 26 (FIGS. 4 and 7) extending therealong. The units and sidewalls are formed to allow nested extension and retraction of each unit relative to the other units and the base support 12. Base structure 12 and extendable units 14 include a plurality of conveying rollers 28 rotatably positioned therealong and between opposite sidewalls 26 of the units. The conveying rollers 28 rotate or roll to allow packages to travel down along extendable loader 10. Preferably, conveying rollers 28 are substantially freely rotatable and extendable loader 10 is angled downwardly such that the articles or packages travel along rollers 28 in response to gravitational forces. Preferably, the downward angle of loader 10 is between at least approximately 3 degrees and at most approximately 5 degrees (such as, for example, approximately 3.5 degrees), to allow gravity to assist movement of packages along the rollers 28, and to assist in extending the conveyor, while still providing clearance of obstacles which may be positioned within truck trailer 16. Optionally, the gravity loader may include a user interface section (not shown) at a forward end 24a of forward extendable unit 24, such as a user interface section of the types described in U.S. Pat. Nos. 6,823,985; 6,533, 096; 6,484,862; 6,431,346; and 6,006,893, which are hereby incorporated herein by reference.

Each of the extendable units 14 is cantileverly supported at a next rearwardly positioned unit or at base structure 12 and extends and retracts with respect thereto via rolling engagement of a pair of support rollers and cantilever support rollers, as discussed below. The braking device 18 functions to engage the cantilever support roller of one or more of the extendable units to limit rotation of the cantilever support roller and to thus limit movement of the extendable unit relative to the other extendable units, as also discussed below. Because the extendable units and base structure are interconnected via chains or cables for extending and retracting the loader (as discussed below), the braking of one of the extendable units functions to limit movement of the other extendable units relative to one another and relative to the base structure.

Preferably, and as shown in FIG. 4, the extendable units and base structure may have raised opposite sidewalls 26 comprising an outer sidewall 26a, an inner sidewall 26b, and an upper surface 26c, such as described in U.S. Pat. Nos. 6,533,096 and 6,484,862, which are hereby incorporated herein by reference. Upper surface 26c forms a raised wall to limit or prevent packages from falling off of extendable loader 10, and preferably slants laterally inwardly and downwardly toward inner side 26b. Conveying rollers 28 are rotatably mounted at and between the opposite inner sidewalls 26b, such that an upper surface of the rollers is positioned substantially below an upper edge of the upper surface. Because the conveying rollers are mounted below the upper portion of the sidewalls, the loader allows for maximum strength of the sidewalls 26 of the extendable units 14 with a minimum overall height of the booms or units, while still allowing for each extendable unit to nest within the rearwardly positioned units.

Extendable loader 10 includes a roller support system 32, which includes a rolling cantilever support roller 32a and a vertical rearward support roller 32b positioned at each extendable unit 20, 22 and 24. Cantilever support roller 32a provides cantilevered support of the respective extendable unit relative to next or adjacent inwardly or rearwardly positioned extendable unit via rolling engagement of cantilever support roller 32a along a surface of a track or rail 34 (FIG. 7), such as an angle iron or the like, which is secured along the upper surface and/or outer wall of the side walls of an adjacent inward or rearward extendable unit. Cantilever support roller 32a is preferably mounted at a rearward end of the respective extendable unit and extends at least slightly upwardly above the upper edge of the sidewall of the respective extendable unit.

Figure 5:
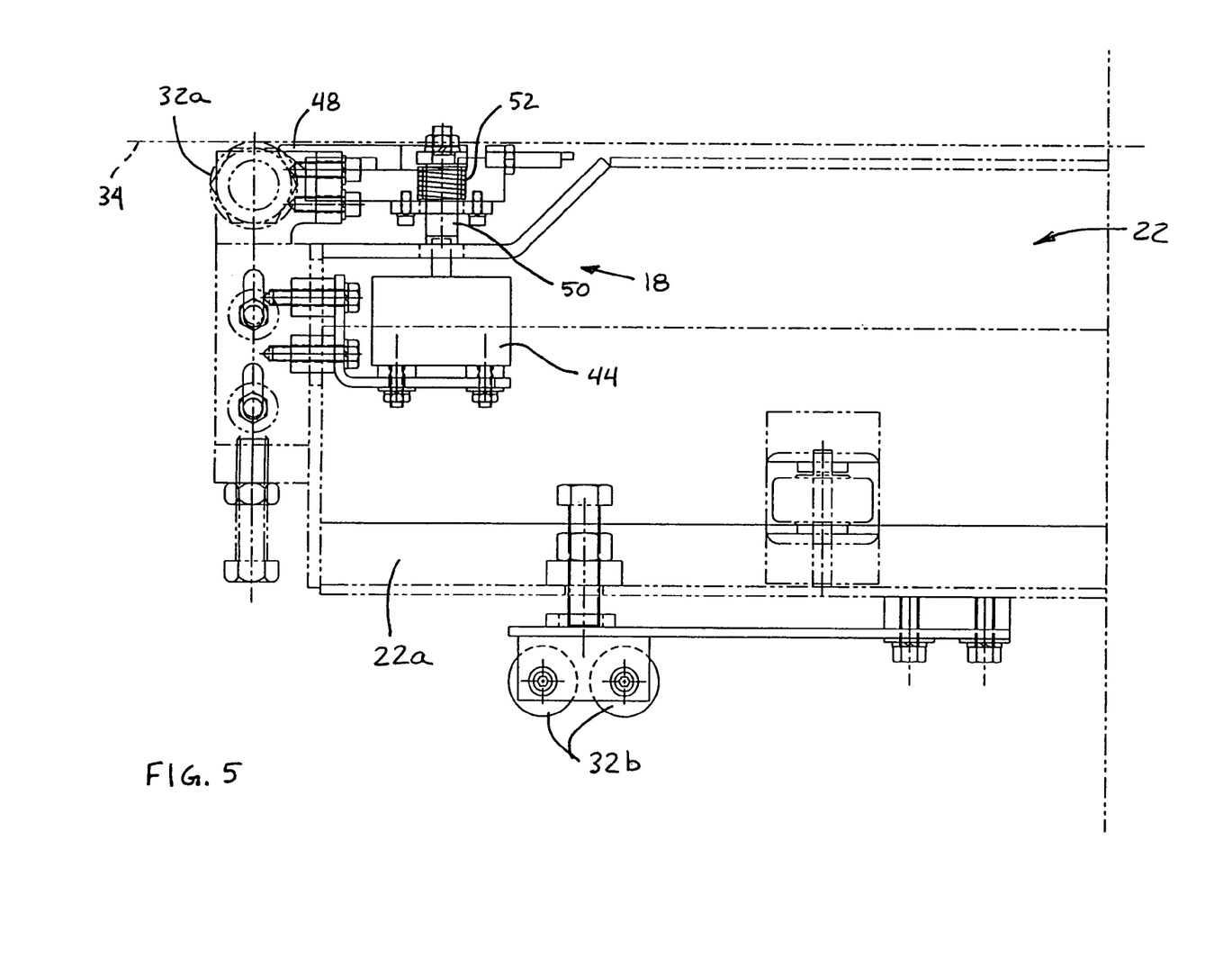
FIG. 5 is an enlarged side elevation and sectional view of an upper inward portion of an extendable unit of the gravity loader of the present invention, showing a braking device in an engaged or braking position.
Figure 7:
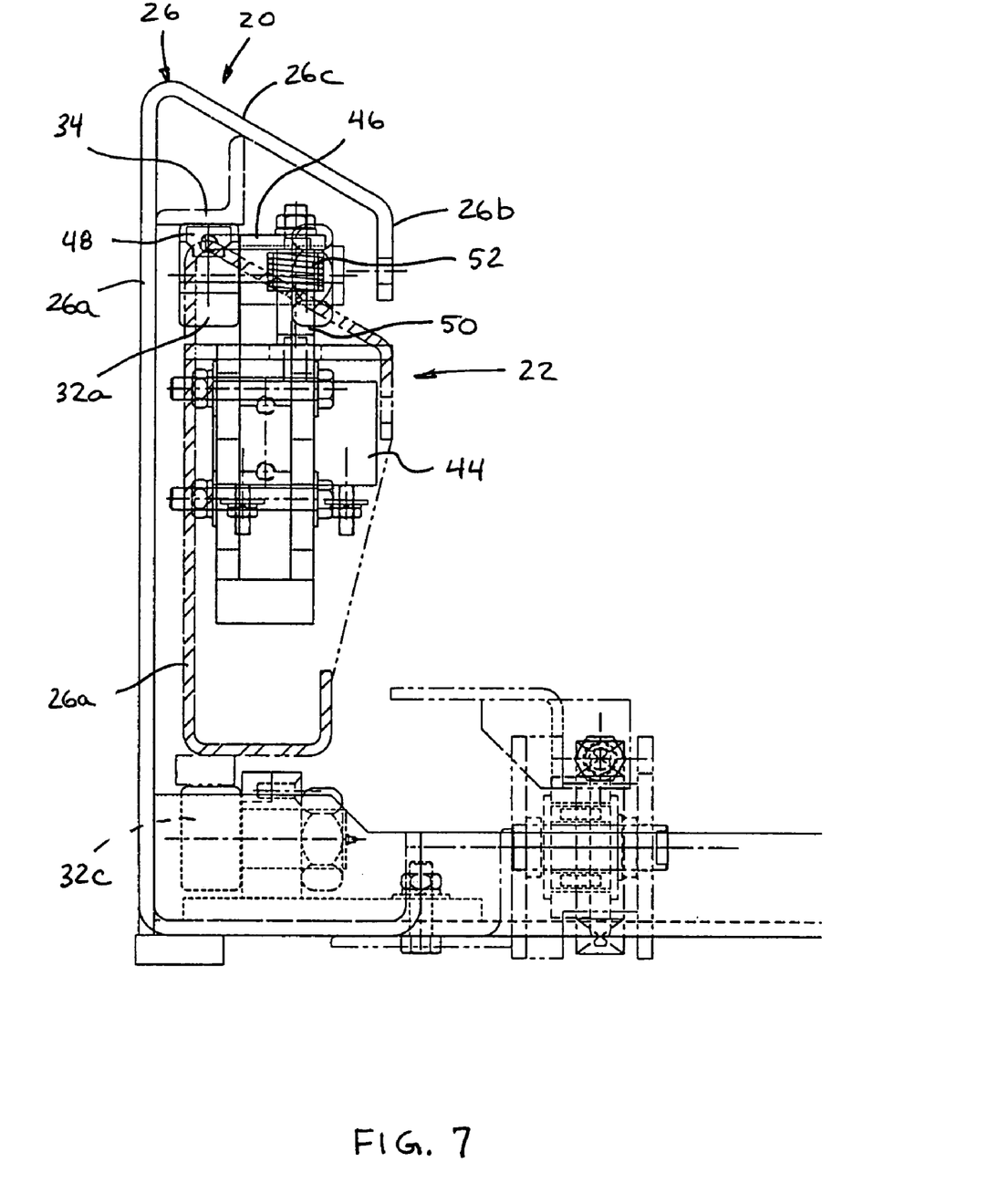
FIG. 7 is an end elevation of the extendable units of FIGS. 5 and 6.
Figure 8:
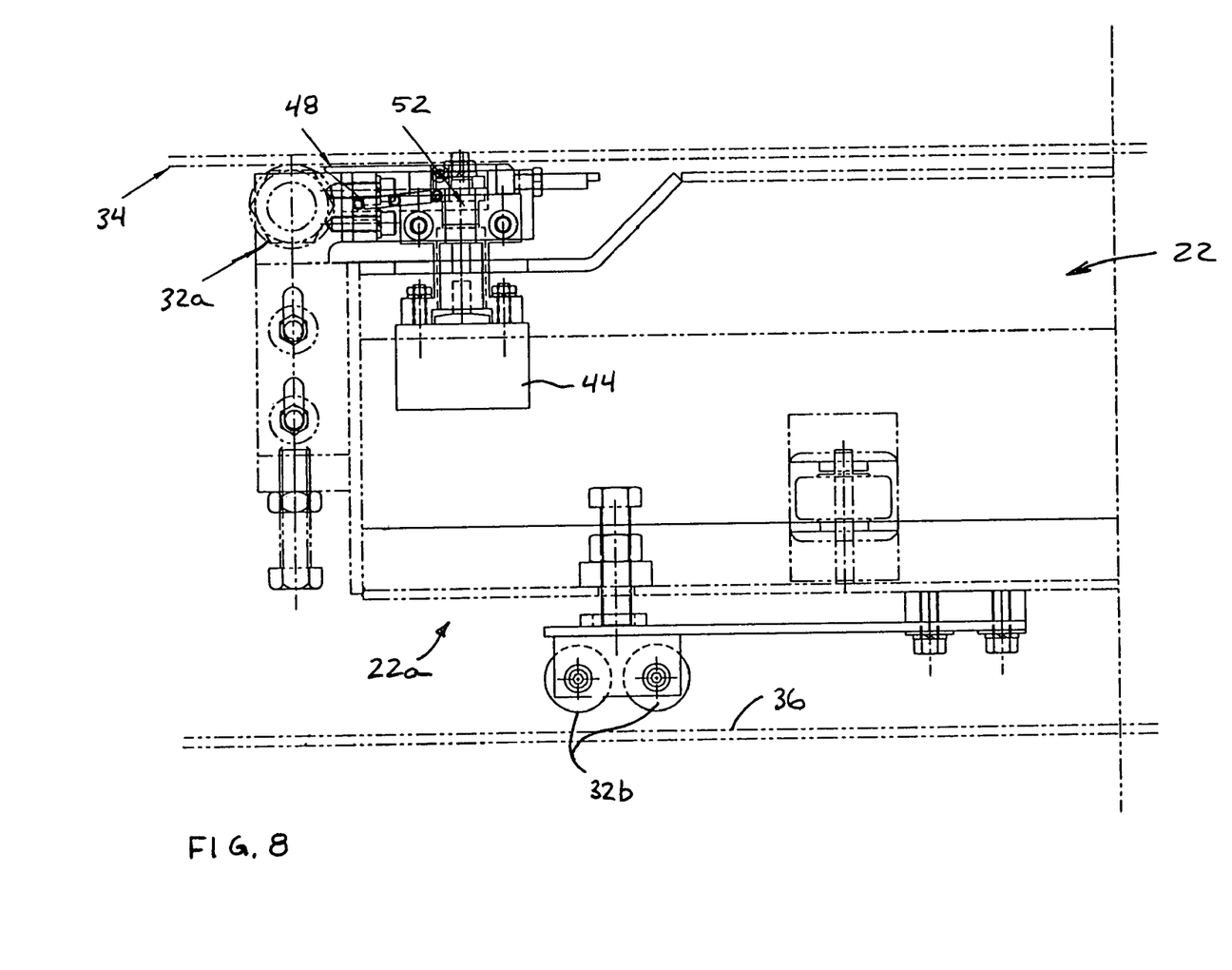
FIG. 8 is an enlarged side elevation and sectional view similar to FIG. 5, showing the braking device in a disengaged or braking position.

Rearward support roller 32b provides vertical support of the respective extendable unit and is positioned at a lower, rearward portion or region of each extendable unit. The extendable unit is preferably also vertically supported by a forward vertical support roller (not shown) rotatably mounted at a forward end of the respective extendable unit. As shown in FIGS. 5, 7 and 8, rearward support roller 32b preferably extends downwardly from the rearward end of the respective unit to provide rolling support along a lower surface or track 36 of the adjacent rearward extendable unit when the respective unit is retracted within the adjacent rearward unit and thus no longer cantileverly supported at the adjacent rearward unit. Accordingly, each extendable unit is rollingly supported by cantilever support rollers, rearward vertical support rollers and forward vertical support rollers 32c (FIG. 7), and preferably is also guided by lateral restraints or rollers; which all rollingly engage corresponding tracks or rails or sidewalls or the like along the adjacent rearward or inward units or the base structure.

The extendable units may be extended relative to each other and to base structure 12 by an extension system, such as an extension system that is powered in one direction to retract the extendable units, and the other direction to extend the units, and optionally allowing gravity to assist in extending the extendable units. For example, and with reference to FIGS. 1 and 2, extendable units 20, 22 and base structure 12 may each include a pair of chains or cables 38 reeved about a respective pair of sprockets 40 or pulleys mounted at or near opposite ends of the extendable units or base structure. Each chain of a particular extendable unit or base structure may be connected to the next outward extendable unit and the next inward extendable unit. For example, an upper run of a chain may connect to the next outward extendable unit, while a lower run portion of the chain may connect to the next inward extendable unit to move the respective extendable units in a substantially uniform manner. Preferably, the extendable units and base structure include a pair of chains or cables between each adjacent or successive pair of units to provide enhanced safety to the system, since a second chain could continue to control extension/retraction of the units if one of the chains were to fail or break.

Thus, when the sprocket 40a of base structure 12 is driven to move the chain 38a along the base structure, the chain (or chains) 38a (an upper run of which is connected to the first extendable unit 20) functions to extend first extendable unit 20 from the base structure. Movement of first extendable unit 20 from base structure 12 causes movement of chain or chains 38b about sprockets 40b of first extendable unit 20 (via the connection of a lower run of chain or chains 38b to base structure 12), which in turn imparts an outward movement of the middle or second extendable unit 22 relative to first extendable unit 20 (via the connection of an upper run of chain (or chains) 38b to middle extendable unit 22). The outward movement of middle extendable unit 22 relative to inward or first extendable unit 20 similarly causes movement of chain (or chains) 38c of middle extendable unit 22 about sprockets 40c, which in turn imparts an outward movement of outward or third extendable unit 24 relative to middle extendable unit 22.

The interconnection of the chains and extendable units thus provides a substantially smooth and uniform extension and retraction of the extendable units from the base structure and from one another as the loader is extended and retracted. A drive motor 41 may rotatably drive one of the sprockets 40a of base structure 12 to drive chain 38a to extend and retract the extendable units from the base structure. Preferably, the extendable units 20, 22 and the base structure 12 each have a pair of chains or cables (such as one at and along each side of the respective extendable unit and base structure) reeved about respective sprockets or pulleys so that if one chain or cable fails, the other chain or cable will still function to maintain the extendable unit relative to the other extendable units and base structure, and, thus, will limit unintentional extension of the extendable units due to gravity. Optionally, the extension/retraction system may comprise single chains or cables or other suitable extending and/or retracting means, such as a cable and motor of the type described in U.S. Pat. Nos. 6,533,096 and 6,484,862, which are hereby incorporated herein by reference, or the like, without affecting the scope of the present invention.

Figure 6:
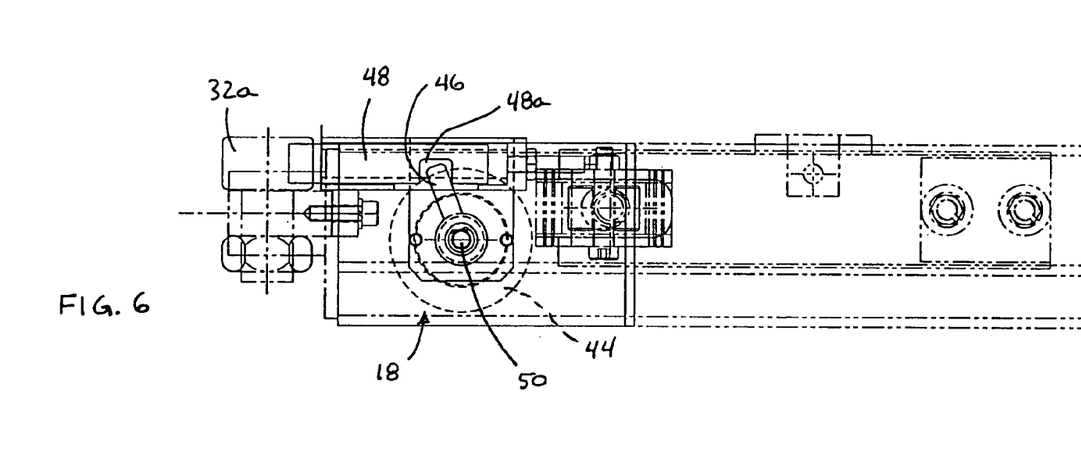
FIG. 6 is a top plan view of the portion of the extendable unit of FIG. 5.
Figure 9:
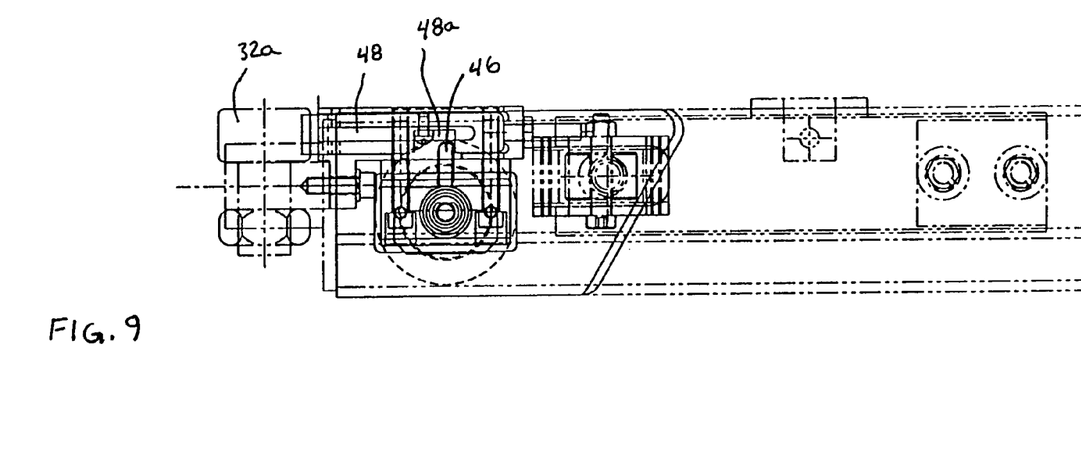
FIG. 9 is a top plan view of the portion of the extendable unit of FIG. 8.

Braking device 18 may be positioned at a rearward end of one of the extendable units, such as at rearward end 22a of middle or second extendable unit 22. Braking device 18 includes a braking element or stop block or wedge-shaped block or element 48 that is selectively engagable with one of the support rollers, such as a rear cam follower or cantilever support roller 32a, to limit rotation of the roller and, thus, to limit relative movement between the middle extendable unit 22 and the inward extendable unit 20. As shown in FIGS. 5-7, braking device 18 includes a rotary solenoid 44 that is operable to rotate an arm 46 that engages braking element 48 to retract braking element 48 from rear cam follower or cantilever support roller 32a. The rotary solenoid 44 may rotate a shaft or axle 50, with the arm 46 attached at an upper end of the shaft 50, whereby rotation of shaft 50 and arm 46 imparts a translational movement of the braking element 48. As shown in FIGS. 6 and 9, the arm 46 engages the braking element 48, such as within a slot or notch or groove 48a in the braking element 48, whereby arcuate movement of the end of the arm received in the slot imparts a generally translational movement of the braking element. In the illustrated embodiment, actuation or energization of rotary solenoid 44 rotates shaft 50 to pivot or rotate arm 46 to move braking element 48 away from engagement with the cantilever support roller 32a. When the braking element 48 is retracted from the cantilever support roller 32a, the cantilever support roller 32a is free to rotate along the upper track 34 of the first or rearward extendable unit 20, so that the extendable units may be extended or retracted.

When the rotary solenoid 44 is deactivated or de-energized, a torsional spring 52 (or other type of spring or biasing means) functions to bias or urge rotation of the shaft 50 in the opposite direction so as to urge the braking element 48 toward and into engagement with the cantilever support roller 32a. As can be seen in FIG. 5, the cantilever support roller 32a would rotate in the counter-clockwise direction during extension of the gravity loader. When the braking element 48 is moved into engagement with the cantilever support roller 32a, the tapered end of the wedge-shaped braking element 48 thus wedges between cantilever support roller 32a and upper track 34 of rearward extendable unit 20, thereby limiting or substantially precluding rotation of the roller 32a along the upper track 34. The spring force of the biasing element or spring is selected to move the braking element sufficiently into engagement with the roller and generally at or between the roller of one unit and the upper track 34 of the other unit, whereby further rotation of the roller along the upper track is substantially limited or restricted or substantially precluded by the presence of the braking element.

Because rotation in the counter-clockwise direction in FIG. 5 is substantially precluded by braking element 48 when engaged with cantilever support roller 32a, extension of the middle extendable unit 22 relative to inward extendable unit 20 is likewise substantially precluded. The wedging action of the wedge-shaped braking element at the support roller functions to substantially limit rotation of the roller when engaged therewith, whereby any further rotation of the roller increases the wedging of the braking element at the roller. Thus, the braking device limits or substantially precludes relative movement of the units in a substantially rapid manner so as to quickly stop and substantially hold the units relative to one another when the braking device is deactivated or de-energized. Also, because the extendable units 20, 22, 24 and base structure 12 are interconnected via the chains 38a-c, when relative movement of extendable unit 22 relative to extendable unit 20 is limited or restricted or substantially precluded, the movement of the extendable units relative to one another and relative to the base structure is also limited or restricted or substantially precluded.

Although shown and described as having a braking device at the middle extendable unit, a braking device may be positioned at one of the other extendable units, or multiple braking devices may be positioned at two or more of the extendable units, without affecting the scope of the present invention. Also, although shown and described as engaging the cantilever support roller of the extendable unit, the braking device and braking element may engage other support or guiding rollers of the extendable unit or units or base structure, or other structural elements of the extendable units or base to limit relative movement therebetween, without affecting the scope of the present invention.

When it is desired to extend or retract the extendable units, the rotary solenoid 44 may be activated or energized (such as in response to activation of a joystick or controller or user input to extend or retract the loader) to pull or move or disengage the braking element 48 from the cantilever support roller 32a (such as shown in FIGS. 8 and 9), so as to allow movement of middle extendable unit 22 relative to inward extendable unit 20 and, thus, of the extendable units relative to one another and relative to the base structure. For example, a user interface or input or joystick 54 (FIG. 2) or the like may be mounted at the outer end 24a of the outer extendable unit 24, such that an operator at the outer end of the loader may selectively actuate the drive motor 41 to extend and retract the extendable units from one another and from the base structure. Extension and retraction of the loader may also be controlled by inputs at a control panel 55 at the base structure. The braking device 18 may be responsive to the user input, such that when the user input is activated to extend or retract the loader, the rotary solenoid is actuated or energized to disengage the braking element or wedge-shaped block from the cantilever support roller. Likewise, when the user input is deactivated or released, the rotary solenoid may be deactivated or de-energized, thereby allowing the torsional spring to urge or pivot the arm to move the braking element into engagement with the cantilever support roller. The loader may also include a stop or bumper or push bar 56 at the outer end 24a of the outer extendable unit 24, whereby contact with the push bar, such as when the extendable loader extends until it contacts an object, causes deactivation of the drive motor and deactivation or de-energization of the rotary solenoid to engage the braking element with the support roller to stop or limit further extension of the loader.

Although shown and described as a rotary solenoid, the braking device may include other actuating means for actuating and deactuating the braking device or disengaging and engaging the braking element, without affecting the scope of the present invention. For example, a linear solenoid or other linear actuator or rotary actuator may be implemented. Preferably, the actuator is operable to disengage the braking element when actuated or energized, such that deactuation or de-energization of the actuator results in braking of the extendable units. Such a configuration provides a substantially fail-safe braking means that limits or substantially precludes extension of the loader when such extension is not desired.

The actuator or solenoid of the braking device of the present invention may be responsive to various inputs or triggering means or events, without affecting the scope of the present invention. For example, the actuator or solenoid may be actuated or energized in response to actuation of the user input, or actuation of the drive motor for driving the chain at the base structure in either direction, or other input or triggering means. The actuator or solenoid also may be deactuated or de-energized in response to a release of an user input, actuation of an emergency stop button or switch or input, a detection of movement at a rate above a threshold level (such as may occur if the chains fail and the loader extends faster than is desired), triggering of a limit switch or the like (that indicates a desired degree of extension of the gravity loader), or a detection that the extendable units are stopped (whereby the braking device may provide a secondary lock mechanism to retain the loader at the desired degree of extension) or the like.

Optionally, the braking device may be deactivated or de-energized to brake or restrict or limit relative movement of the extendable units in response to a timing device, such that the engagement of the braking element is delayed a brief period of time following the release of the user input or other triggering event or input. This allows the gravity loader to begin stopping due to the deactivation of the drive motor and sprockets and chains before the loader is stopped via the braking device. The braking device may be responsive to such a timing device when the loader is stopped via release of the user input, but may not have such a time delay function when the triggering event that triggers the engagement of the braking element comprises contact with the stop bumper or actuation of an emergency stop button or switch or input or detection of an excessive speed of extension or the like, since it may be desirable to quickly limit or stop further extension of the loader in such situations.

Therefore, the present invention provides an extendable and nestable gravity loader which is oriented at a desired downward angle for easy extension of the extendable units and easy travel of packages along the rollers thereof, while still providing sufficient clearance for obstacles which typically may be found along a lower surface or floor of a truck trailer or the like. The braking device of the present invention provides a substantially fail-safe braking of the gravity loader, such that the gravity loader will only extend when an operator selectively actuates the user input, and will be automatically braked or substantially locked in situations where an operator is not extending or retracting the loader. The braking device functions to engage a braking element with one or more of the supporting or guiding rollers of the extendable unit or units to limit or substantially preclude extension of the loader in response to a release of a user input or contact of a stop or bumper at the end of the loader or other triggering event. The dual chain connections of the base structure and individual extendable units also limits or substantially precludes movement of a non-braked extendable unit relative to the braked extendable unit, since even if one chain fails or breaks, the other chain will serve to maintain the connection with the other extendable unit or base structure.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property right or privilege is claimed are defined as follows:

1. An extendable conveyor comprising:
   a support structure;
   at least one extendable unit that is supported in a cantilevered manner and that is movable between an extended position and a retracted position nested within said support structure, said extendable unit having at least one support roller for rollingly engaging at least one of another extendable unit and said support structure as said extendable unit is extended or retracted;
   a plurality of conveying rollers rotatably supported at said at least one extendable unit, said plurality of conveying rollers defining a gravity operated conveying surface; and
   a braking device operable to limit rotation of at least one support roller via selective engagement of a braking element with said support roller, said braking device being activatable to disengage said braking element from said support roller in response to actuation of a user input, said braking device being biased to engage said braking element with said support roller when said braking device is deactivated.

2. The extendable conveyor of claim 1, wherein said at least one extendable unit and said conveying surface are oriented at an angle with respect to horizontal, the angle being between at least approximately three degrees and at most approximately five degrees with respect to horizontal.

3. The extendable conveyor of claim 1, wherein said at least one extendable unit has an upper portion along opposite sides thereof, said plurality of conveying rollers being supported below said upper portion of said at least one extendable unit.

4. The extendable conveyor of claim 1, wherein said at least one extendable unit comprises at least two extendable units and wherein at least one of said at least two extendable units is cantilevered supported along an upper portion of another of said at least two extendable units.

5. The extendable conveyor of claim 4, wherein said at least one support roller comprises at least one cantilever support roller for said extendable units, said cantilever support roller rollingly engaging a surface of an upper portion of an inwardly positioned extendable unit.

6. The extendable conveyor of claim 5, wherein said braking element is selectively engaged between said at least one cantilever support roller and said surface.

7. The extendable conveyor of claim 1, wherein said braking device comprises an actuator that is activated to disengage said braking element from said support roller and deactivated to engage said braking element with said support roller.

8. The extendable conveyor of claim 7, wherein said braking device includes a biasing element that biases said braking element toward engagement with said support roller.

9. The extendable conveyor of claim 8, wherein said actuator comprises an electro-mechanical solenoid.

10. The extendable conveyor of claim 8, wherein said actuator comprises a rotary solenoid operable to move said braking element to disengage said braking element from said support roller.

11. The extendable conveyor of claim 10, wherein said biasing element comprises a torsional spring.

12. The extendable conveyor of claim 7, wherein said actuator is activatable in response to actuation of a user input for selectively extending and retracting said at least one extendable unit.

13. The extendable conveyor of claim 12, wherein said actuator is deactivatable in response to at least one of deactuation of a user input, actuation of a stop input, and a timing device.

14. An extendable loader comprising:
    a support structure;
    a first extendable unit that is supported in a cantilevered manner from said support structure and a second extendable unit that is supported in a cantilevered manner from said first extendable unit, said first and second extendable units being mechanically extendable between an extended position and a retracted position nested within said support structure, said first and second extendable units having support rollers for rollingly engaging at least one of the other extendable unit and said support structure as said extendable units are extended or retracted;
    a plurality of conveying rollers rotatably supported at said first and second extendable units, said plurality of conveying rollers defining a gravity operated conveying surface; and
    a braking device operable to limit rotation of at least one of said support rollers via selective engagement of a braking element with said at least one support roller, said braking device comprising an actuator that is activatable to disengage said braking element from said support roller in response to actuation of a user input, said braking device including a biasing element that urges said braking element toward engagement with said at least one support roller when said actuator is deactivated.

15. The extendable loader of claim 14, wherein said braking device is mounted at one of said first and second extendable units and is operable limit movement of said one of said first and second extendable units relative to one of the other of said first and second extendable units and said support structure.

16. The extendable loader of claim 15, wherein said first extendable unit is interconnected to said second extendable unit and said second extendable unit is interconnected to said base structure to substantially uniformly extend and retract said first extendable unit relative to said second extendable unit and said second extendable unit relative to said support structure.

17. The extendable loader of claim 16, wherein limiting movement of one of said first and second extendable units relative to one of the other of said first and second extendable units and said support structure correspondingly limits movement of the other of said first and second extendable units relative to one of said support structure and said one of said first and second extendable units.

18. The extendable loader of claim 14, wherein said actuator comprises an electro-mechanical solenoid that is activatable to translationally move said braking element away from said at least one support roller.

19. The extendable loader of claim 18, wherein said actuator comprises a rotary solenoid, said rotary solenoid being activatable to rotate an arm to translationally move said braking element away from said at least one support roller.

20. The extendable loader of claim 14, wherein said braking element is wedge-shaped and is wedged between said at least one support roller and a track along which said support roller rolls, said wedge-shaped braking element limiting rotation of said at least one support roller along said track when engaged with said at least one support roller.

21. The extendable loader of claim 14, wherein said actuator is activatable in response to actuation of a user input for selectively extending and retracting said at least one extendable unit.

22. The extendable loader of claim 14, wherein said actuator is deactivatable in response to at least one of deactuation of a user input, actuation of a stop input, and a timing device.

* * * * *